(12) United States Patent
Arioua et al.

(10) Patent No.: US 12,517,234 B2
(45) Date of Patent: Jan. 6, 2026

(54) TIME-OF-FLIGHT SYSTEM AND TIME-OF-FLIGHT METHODS

(71) Applicant: Sony Semiconductor Solutions Corporation, Atsugi (JP)

(72) Inventors: Madani Arioua, Stuttgart (DE); Morin Dehan, Stuttgart (DE); Anthony Antoun, Stuttgart (DE); Carlos Belmonte Palmero, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 168 days.

(21) Appl. No.: 18/287,648

(22) PCT Filed: Apr. 26, 2022

(86) PCT No.: PCT/EP2022/061087
§ 371 (c)(1),
(2) Date: Oct. 20, 2023

(87) PCT Pub. No.: WO2022/229208
PCT Pub. Date: Nov. 3, 2022

(65) Prior Publication Data
US 2024/0183955 A1    Jun. 6, 2024

(30) Foreign Application Priority Data

Apr. 28, 2021  (EP) .................................... 21170946

(51) Int. Cl.
*G01S 7/481*     (2006.01)
*G01S 7/491*     (2020.01)
(Continued)

(52) U.S. Cl.
CPC .......... *G01S 7/4915* (2013.01); *G01S 7/4814* (2013.01); *G01S 7/4815* (2013.01); *G01S 7/4816* (2013.01);
(Continued)

(58) Field of Classification Search
CPC .... G01S 7/4814; G01S 7/4815; G01S 7/4816; G01S 7/4911; G01S 7/4915; G01S 17/36;
(Continued)

(56) References Cited

U.S. PATENT DOCUMENTS

2015/0256767 A1   9/2015   Schlechter
2016/0300870 A1   10/2016  Keelan
(Continued)

FOREIGN PATENT DOCUMENTS

WO   WO-2016166651 A1   10/2016
WO   WO-2017149370 A1   9/2017
(Continued)

OTHER PUBLICATIONS

International Search Report and Written Opinion mailed on Sep. 23, 2022, received for PCT Application PCT/EP2022/061087, filed on Apr. 26, 2022, 20 pages including English Translation.
(Continued)

*Primary Examiner* — Mark R Gaworecki
(74) *Attorney, Agent, or Firm* — XSENSUS, LLP

(57) ABSTRACT

A Time-of-Flight system having a light source which emits first light rays at a first wavelength and second light rays at a second wavelength to an object, the second wavelength being larger than the first wavelength, and a time-of-flight sensor which detects the first light rays at the first wavelength and the second light rays at the second wavelength, and generates first time-of-flight data associated with the detected first light rays and second time-of-flight data associated with the detected second light rays.

15 Claims, 9 Drawing Sheets

(51) Int. Cl.
| | |
|---|---|
| *G01S 7/4911* | (2020.01) |
| *G01S 7/4915* | (2020.01) |
| *G01S 17/89* | (2020.01) |
| *G01S 17/894* | (2020.01) |
| *H01S 5/42* | (2006.01) |
| *H10F 39/00* | (2025.01) |
| *H10F 39/12* | (2025.01) |
| *G01S 17/36* | (2006.01) |
| *G06V 40/16* | (2022.01) |
| *H01S 5/026* | (2006.01) |
| *H01S 5/04* | (2006.01) |
| *H01S 5/10* | (2021.01) |
| *H01S 5/343* | (2006.01) |
| *H10F 39/18* | (2025.01) |

(52) U.S. Cl.
CPC .......... *G01S 7/4911* (2013.01); *G01S 17/894* (2020.01); *H01S 5/426* (2013.01); *H10F 39/8023* (2025.01); *H10F 39/806* (2025.01); *G01S 17/36* (2013.01); *G06V 40/166* (2022.01); *H01S 5/026* (2013.01); *H01S 5/041* (2013.01); *H01S 5/1092* (2013.01); *H01S 5/34313* (2013.01); *H10F 39/1847* (2025.01)

(58) Field of Classification Search
CPC ..... G01S 17/894; G06V 40/166; H01S 5/026; H01S 5/041; H01S 5/1092; H01S 5/34313; H01S 5/426; H10F 39/1847; H10F 39/8023; H10F 39/806
See application file for complete search history.

(56) References Cited

U.S. PATENT DOCUMENTS

| | | |
|---|---|---|
| 2016/0327638 A1 | 11/2016 | Dielacher |
| 2018/0059218 A1* | 3/2018 | Buettgen ................ G01S 7/497 |
| 2018/0106891 A1 | 4/2018 | Thurner |
| 2019/0146073 A1 | 5/2019 | Gutierrez |
| 2019/0212447 A1* | 7/2019 | Viswanathan ........ G01S 7/4861 |
| 2019/0364254 A1 | 11/2019 | Ortiz Egea |
| 2020/0015923 A1 | 1/2020 | Scheib |
| 2020/0182697 A1 | 6/2020 | Peleg |
| 2020/0333312 A1 | 10/2020 | Islam |

FOREIGN PATENT DOCUMENTS

| | | |
|---|---|---|
| WO | WO-2018082762 A1 | 5/2018 |
| WO | 2020/104296 A2 | 5/2020 |
| WO | 2020/264272 A1 | 12/2020 |

OTHER PUBLICATIONS

Aongus Mccarthy, "Multiple wavelength time-of-flight sensor based on time-correlated single-photon counting" Review of Scientific Instruments, Aug. 2005, pp. 083112-1-083112-7.

Rowland De Roode, et al., Multispectral Dtectors: Multispectral system evaluates treatments in dermatology, Apr. 1, 2006.

* cited by examiner

TIME-OF-FLIGHT SYSTEM AND TIME-OF-FLIGHT METHODS

CROSS-REFERENCE TO RELATED APPLICATIONS

The present application is based on PCT filing PCT/EP2022/061087, filed Apr. 26, 2022, and claims priority from European Patent Application No. 21170946.4, filed Apr. 28, 2021, the entire contents of each are incorporated herein by reference.

TECHNICAL FIELD

The present disclosure generally pertains to a Time-of-Flight system and a Time-of-Flight method for controlling the Time-of-Flight system.

TECHNICAL BACKGROUND

Typically, known time-of-flight (ToF) systems have a light source for illuminating a region of interest and a camera for detecting light stemming from the region of interest for determining a distance between the light source and the region of interest. The distance can be determined, for example, based on a phase shift of the light introduced when traveling from the light source to the camera, which, in turn, is associated with the distance, and it can be based, for example, on a roundtrip time of the light when traveling from the light source to the camera.

For detection of light in the time-of-flight technology, it is known to use light sources for emitting light at specific wavelengths, e.g. 850 nm, 940 nm, etc., towards objects within the region of interest and also to use time-of-flight sensors having multiple pixels, which detect the light stemming from the illuminated objects.

Although there exist techniques for focusing and detecting light in time-of-flight systems, it is generally desirable to provide a time-of-flight system and a method for controlling such a time-of-flight system.

SUMMARY

According to a first aspect, the disclosure provides a Time-of-Flight system comprising a light source configured to emit first light rays at a first wavelength and second light rays at a second wavelength to an object, the second wavelength being larger than the first wavelength and a time-of-flight sensor configured to detect the first light rays at the first wavelength and the second light rays at the second wavelength, and to generate first time-of-flight data associated with the detected first light rays and second time-of-flight data associated with the detected second light rays.

According to a second aspect, the disclosure provides a Time-of-Flight method, comprising driving a light source to emit first light rays at a first wavelength and second light rays at a second wavelength to an object, the second wavelength being larger than the first wavelength and driving a time-of-flight sensor to detect the first light rays at the first wavelength and the second light rays at the second wavelength, and to generate first time-of-flight data associated with the detected first light rays and second time-of-flight data associated with the detected second light rays.

According to a third aspect, the disclosure provides a Time-of-Flight method, comprising emitting first light rays at a first wavelength and second light rays at a second wavelength to an object, the second wavelength being larger than the first wavelength, detecting the first light rays at the first wavelength and the second light rays at the second wavelength and generating first time-of-flight data associated with the detected first light rays and second time-of-flight data associated with the detected second light rays.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 3:
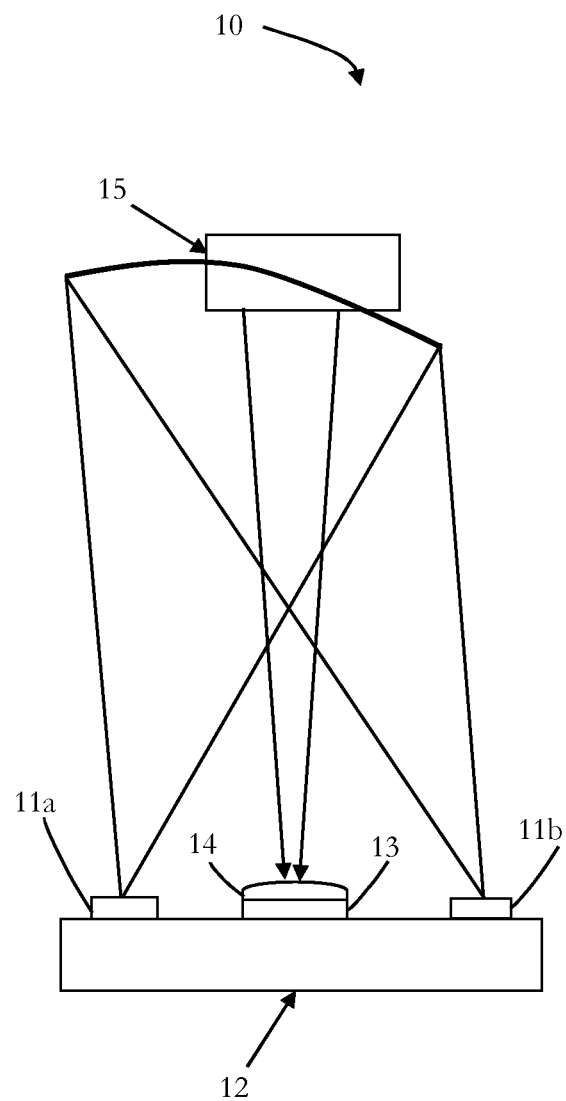
FIG. 3 schematically illustrates an example of a time-of-flight (ToF) system including a light source having two light source elements.

Before a detailed description of the embodiments under reference of FIG. 3 is given, general explanations are made.

As mentioned in the outset, time-of-flight (ToF) systems may have a light source for illuminating a region of interest and a time-of-flight camera for detecting light stemming from the region of interest for determining a distance between the light source and the region of interest. A time-of-flight camera typically has a ToF image sensor, optical parts, such as a lens system, and the like.

Generally, it is known that ToF systems are sensitive to a range of environmental parameters, for example the sunlight, which results in saturation in presence of high levels of sunlight in the illuminated region of interest, and thus, the noise created on the sensor by sunlight makes the Signal to Noise Ratio (SNR) in the region of interest low, i.e. rendering the estimation of depth imprecise, and the ToF system's efficiency low.

In addition, the efficiency of a ToF system typically depends not only on its noise tolerance when it comes to the solar spectrum power, on the quantum efficiency, and the like, but also on objects' colors. Materials of illuminated objects within the region of interest have different reflectivity, and therefore the emitted light is not reflected equally. This may result in a loss of accuracy and precision for example with darker materials such as human hair or dark car paintings. This is also valid in the near-infrared (NIR)-based imaging systems such as NIR iToF (indirect-ToF). The NIR-based imaging systems function in the near-infrared range (750 nm-1000 nm), and typically their operating wavelengths are at (about) 850 nm or at (about) 940 nm (without limiting the present disclosure to these specific wavelengths).

Figure 1:
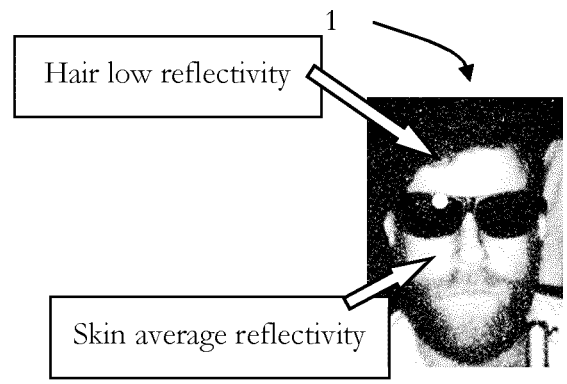
FIG. 1 illustrates an image of a human's face captured by a NIR-based imaging system in a FaceID scenario.

For illustration purposes, FIG. 1 illustrates an image 1 of a human's face captured by a NIR-based imaging system in a FaceID scenario. In this example, the NIR ToF system has an operation wavelength at 940 nm or at 980 nm. At this NIR operating wavelength, the skin reflectivity allows to determine depth measurement on the skin, but the depth of black hair or black beard cannot be accurately determined, due to the hair and beard reflectivity in NIR. As can be taken from FIG. 1, in the near-infrared range, human hair has low reflectivity and human skin has average reflectivity. At NIR operating wavelengths, wherein materials, such as human hair, have low reflectivity, the associated SNR in the region of interest may be low, and, thus, the depth may be difficult to determine.

Short-wave infrared (SWIR) imaging systems have been envisaged as a solution to the saturation and color dependency problems faced by NIR-based imaging systems. SWIR imaging systems, typically, have operating wavelengths between 1000 and 1700 nm, for example, at around 1550 nm, without limiting the present disclosure in that regard. Generally, in embodiments of the present disclosure, the wavelength of NIR light is smaller than the wavelength for SWIR light. SWIR embodiments may effectively exploit the absorption of sunlight by the atmosphere at wavelengths higher than the NIR range wavelength, to increase the overall SNR in presence of sunlight in the region of interest. However, if a SWIR wavelength of, e.g., 1550 nm is used in the FaceID scenario of FIG. 1, the reflectivity of hair may be higher, and the reflectivity of the skin may be lower, which may result in a lower contrast and, thus, different intensities within the resulting image.

Figure 2:
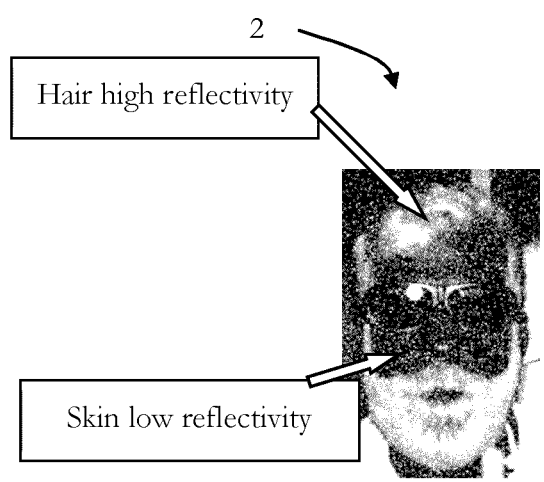
FIG. 2 illustrates an image of the human's face of FIG. 1, captured by a short-wave infrared (SWIR)-based imaging system.

FIG. 2 exemplarily illustrates an image 2 of the human's face of FIG. 1, captured by a short-wave infrared (SWIR)-based imaging system in a FaceID scenario. In this example, the SWIR TOF system has an operating wavelength at 1550 nm. At such an operating wavelength, human hair has high reflectivity and human skin has low reflectivity, as can be taken from FIG. 2. Using a single wavelength to illuminate an object in the region of interest imposes an undesirable limitation to ToF systems performance.

In a real-life scenario, such as the FaceID scenario described above, the region of interest may be usually composed of materials having different reflectivity, e.g. hair and skin, and conventional ToF systems performance may be strongly related to material reflectivity, as it can be taken from FIGS. 1 and 2 above. Additionally, some materials with low reflectivity in the NIR domain of the spectrum have higher reflectivity in the SWIR domain of the spectrum. For instance, this is the case of the human hair, wherein the hair, when captured by a SWIR-based imaging system, is more visible than the skin.

In view of the discussion above, it has been recognized that combining, in a ToF system, light sources operating at a specifically selected wavelength, such as NIR (e.g. at 940 nm) and SWIR (e.g. at 1550 nm) may improve the ambient light robustness and solve the problem of color dependency of the illuminated objects within the region of interest.

Moreover, in an indirect time-of-flight (iToF) system, where the distance is calculated based on the phase delay between the emitted light and the detected reflected light, an ambiguous range issue may occur, due to the fact that these conventional ToF systems operate at a single wavelength, as already discussed (as the distance is directly related to the phase shift, in principle, the same phase shift occurs at different distances). To extend the unambiguous range, measurements are typically performed twice, using two different modulation frequencies sequentially, whereby the distance ambiguity can be removed. This results in a reduced frame rate and in a reduced motion robustness of the iToF system.

It has been recognized that by using two wavelengths as operating wavelengths in a single integrated ToF system (device or the like), wherein one wavelength is larger than the other, at least one or more of the issues mentioned above, may be addressed.

Consequently, some embodiments pertain to a time-of-flight (ToF) system having a light source configured to emit first light rays at a first wavelength and second light rays at a second wavelength to an object, the second wavelength being larger than the first wavelength, and a time-of-flight sensor configured to detect the first light rays at the first wavelength and the second light rays at the second wavelength, and to generate first time-of-flight data associated with the detected first light rays and second time-of-flight data associated with the detected second light rays.

Generally, embodiments of the present disclosure pertain to different ToF technologies, e.g. direct ToF, Spot ToF, indirect ToF, etc. However, in the following mainly indirect ToF is discussed, where the distance is determined based on a phase shift, wherein the iToF technology may also be combined with others, such as Spot ToF without limiting the present disclosure to this specific combination.

Generally, the light source may be configured as a pulsed light source, a continuous light source or the like and it may be based on LEDs (Light Emitting Diodes), laser elements, e.g. VCSELs (Vertical Cavity Surface Emitting Lasers), EELs (Edge Emitting Lasers), or the like. The term "laser" is understood functionally in some embodiments and the VCSEL may include multiple vertical-cavity surface-emitting lasing elements which together form the laser, i.e. the VCSEL. Hence, generally, explanations made for the VCSEL also apply to the single VCSEL elements of the VCSEL.

The light source may include a single light source element or may contain one or more light source elements. The light source may be configured to emit light rays at a first wavelength and at a second wavelength simultaneously or sequentially, e.g. by having a single or multiple narrow band light source elements. In some embodiments, without limiting the present disclosure to this specific example, the two wavelengths are in the NIR, e.g. at (about) 940 nm, and in the SWIR, e.g. at (about) 1550 nm. As mentioned, these numbers are only given as an example, and in other embodiments any specific wavelength values may be used.

Moreover, the light source may emit light rays at more than two wavelengths, for example, the light source may emit light rays at a first wavelength being any wavelength between 750 nm and 1000 nm, at a second wavelength being any wavelength between 1000 nm and 1700 nm, at a third wavelength being any wavelength from 1000 nm and 1700 nm, at a fourth wavelength being any wavelength from 10 nm to 400 nm, and the like. The light source may emit light rays at a specific wavelength, and may be modulated at with different coded signals, and/or frequencies.

The time-of-flight (ToF) sensor may be specifically designed for time-of-flight measurements and may be adapted to detect light emitted from the light source as described herein, such as to detect the first light rays at the first wavelength and the second light rays at the second wavelength. As mentioned above, the ToF sensor (and the associated readout circuit) may be configured for direct ToF (dToF), where the time delay of the photons emitted by the light source and reflected by a scene are detected, and/or it may be configured for indirect ToF (iToF) together with the associated readout circuit), where basically a phase shift of the light emitted by the light source and reflected by a scene is detected, etc.

The ToF sensor may be based on at least one of the following technologies: CMOS (complementary metal-oxide semiconductor), CCD (charge coupled device), SPAD (single photon avalanche diode), CAPD (current assisted photodiode) technology or the like.

The ToF sensor may generate first time-of-flight data associated with the detected first light rays and second time-of-flight data associated with the detected second light rays. The first time-of-flight data and the second time-of-flight data may be processed and analyzed by the ToF system using circuitry for processing and analyzing the detection signals generated by the ToF sensor. The circuitry may be a logic circuit, being or including, for example, a control unit and it may be configured to control the ToF system accordingly, as it is described herein. The ToF system may provide a distance measurement, may scan a region of interest and may provide depth maps/images or the like from the region of interest. The ToF system may be arranged for time-of-flight measurement and may also include corresponding circuitry for reading out and/or analyzing signals produced by the ToF sensor and the like.

The ToF system may be used in different technology applications, such as in automotive, for example in automotive outdoor safety applications for detecting objects and obstacles, for detecting ice, black ice, snow, water and the like, in applications requiring face recognition, as well as in smart phones or other electronic devices, such as computers, laptops, or in medical device, etc.

In some embodiments, the ToF sensor may include at least one first imaging element of a first type configured to detect the first light rays and at least one second imaging element of a second type configured to detect the second light rays. The ToF sensor may be assembled with narrow band filters such that each one of the first and second imaging element to be sensitive to a single wavelength, e.g. to the first wavelength of the first light rays or the second wavelength of the second light rays, and the like. The ToF sensor may comprise wider infrared band pass filters (IRBPF) to cut light below 940 nm or the like.

The ToF sensor may be sensitive for example to NIR and SWIR wavelengths. Traditionally, Si-based sensors are usually transparent to longer wavelengths, and thus the fabrication process may be based on InGaAs substrates or similar. Those substrates are already in use for existing SWIR imaging systems and are sensitive to both NIR and SWIR.

In some embodiments, the at least one first imaging element of the first type may be arranged in a first layer and the at least one second imaging element of the second type is arranged in a second layer. The first layer and the second layer may be arranged on top of each other, without limiting the present disclosure in that regard. At least in some embodiments, the least one first imaging element of the first type may be adjacent to the least one second imaging element of the second type. The first type and second type of imaging elements may be arranged in one layer forming a mosaic pattern, such that alternatingly a first type imaging element is located adjacent to a second type imaging element. The ToF sensor may be made for example of a pixel array in which two or more groups of pixels, i.e. types of imaging elements, are sensitive to the operating wavelength, i.e. the first and/or second wavelength, of the light source. The groups of pixels may be manufactured either side by side or on top of each other depending on the manufacturing requirement and wavelengths used in the light source. Every group of pixels may be operated with independent demodulation signals. The demodulation signal may be generated in accordance with the signal used in the light source. Exposure time for the different groups of pixels can be defined independently in order to maximize SNR for the different wavelength.

Alternatively, the ToF sensor may include at least one first imaging element of a first type configured to detect the first light rays, at least one second imaging element of a second type configured to detect the second light rays, and at least one third imaging element of a third type configured to detect third light rays. For example, the ToF sensor may be made of a pixel array in which three or more groups of pixels, e.g. NIR (750 nm to 1000 nm)-SWIR1 (1000 nm to 1700 nm)-SWIR2 (1000 nm to 1700 nm)-UV (10 nm to 400 nm), are sensitive to the operating wavelength of the light source. The groups of pixels may be arranged in a similar manner as for the Bayer patterns in RGB cameras, forming a macro pixel of 2×2 pixels, without limiting the present disclosure in that regard.

In some embodiments, the ToF sensor may further include a tunable filter configured to pass either the first light rays or the second light rays. The tunable filter may be configured to let the first light rays, second light or consecutive light rays pass in response to an electrical control signal, such that the same imaging elements may be used for either detecting the first light rays or the second light rays by tuning the filter accordingly to the wavelength which should be passed through the filter.

In some embodiments, the first time-of-flight data may be generated by applying a first demodulation scheme to the at least one first imaging element of the first type and the second time-of-flight data are generated by applying a second demodulation scheme to the at least one second imaging element of the second type. The first demodulation scheme may be applied independently from the second demodulation scheme, such that different modulation schemes can be used for ToF measurements.

After recording the first time-of-flight data associated with the detected first light rays and second time-of-flight data associated with the detected second light rays, a raw depth map is generated for the first imaging element of the first type and another raw depth map is generated for the second imaging element of the second type. Combining those two depth maps may extend the unambiguous range with a single depth acquisition sequence, since for measurements with different wavelengths the ambiguity distance is different.

In some embodiments, as mentioned, the first wavelength may be within a near-infrared range and the second wavelength may be within a short-wave infrared range. The first wavelength may be within a range of 750 nm to 1000 nm, for example at (about) 940 nm or 980 nm and the second wavelength may be within a range of 1000 nm to 1700 nm, for example at (about) 1550 nm.

In some embodiments, the light source may include at least one dual vertical-cavity surface-emitting laser configured to emit the first light rays and/or the second light rays. The dual vertical-cavity surface-emitting laser is a VCSEL that emits light at two wavelengths, without limiting the present disclosure in that regard. The light emission may be extended to any number of wavelengths. Such a light source may be a hybrid light source having, for example, a NIR and SWIR operating wavelengths.

In some embodiments, the ToF system may further comprise a first lens configured to focus the first light rays in the first layer and a second lens configured to focus the second light rays in the second layer. Alternatively, the ToF system may further comprise one lens, which focuses the first light rays in the first layer and the second light rays in the second layer. The lens may provide sufficient performances at all operating wavelengths. The design of the lens may consider the depth, that is the distance between each one of the first layer and the second layer, i.e. the "height", of each one of the first layer and the second layer with respect to the lens, in order to minimize chromatic aberration in all layers, and to provide sufficient sharpness in all layers, e.g. to maximize the sharpness in all layers. In particular, the lens design may consider the depth of every layer in the calculation of the focal lengths at each operating wavelength and in order to provide sufficient modulation transfer function (MTF), indicative of the sharpness and the quality of the captured image, with respect to the Nyquist frequency of all pixel layers.

In some embodiments, the ToF system may further comprise a control configured to control the light source to emit the first light rays at the first wavelength and the second light rays at the second wavelength simultaneously. Moreover, at least in some of the embodiments, the light is generated simultaneously at two or more wavelengths, wherein a first and second (or more) wavelengths are generated and/or emitted in parallel, without limiting the present disclosure in that regard. Alternatively, the light may be generated sequentially, such that at a first point of time the first light rays are generated at a first wavelength, at a second point of time the second light rays are generated at a second wavelength, etc.

In some embodiments, the ToF system may further comprise a logic circuit configured to fuse the first time-of-flight data and the second time-of-flight data for enhancing a signal intensity in the fused data. The signal intensity depends on a material reflectivity of the object illuminated by the light source and the material reflectivity may be different for the first light rays at the first wavelength and the second light rays at the second wavelength.

In some embodiments, the first and second wavelength may be each selected based on the material reflectivity of the object illuminated by the light source. For example, when a human's face is the object illuminated by the light source, the human hair has higher reflectivity at the SWIR wavelength than at the NIR wavelength. On the contrary, human skin has higher reflectivity at the NIR wavelength than at the SWIR wavelength.

In some embodiments, the logic circuit may be further configured to perform de-aliasing on the first time-of-flight data and the second time-of-flight data by combining phase information of the first and second wavelength. De-aliasing on the time-of-flight data may be performed to solve any ambiguity errors occur during the process, i.e. extend the unambiguous range with a single depth acquisition sequence (see also the discussion of the distance ambiguity above).

Some embodiments pertain to a time-of-fight (ToF) method including driving a light source to emit first light rays at a first wavelength and second light rays at a second wavelength to an object, the second wavelength being larger than the first wavelength and driving a time-of-flight sensor to detect the first light rays at the first wavelength and the second light rays at the second wavelength, and to generate first time-of-flight data associated with the detected first light rays and second time-of-flight data associated with the detected second light rays.

Some embodiments pertain to a time-of-fight (ToF) method, which may be performed by the time-of-flight system as discussed herein. The method includes emitting first light rays at a first wavelength and second light rays at a second wavelength to an object, the second wavelength being larger than the first wavelength, detecting the first light rays at the first wavelength and the second light rays at the second wavelength, and generating first time-of-flight data associated with the detected first light rays and second time-of-flight data associated with the detected second light rays.

In some embodiments, the ToF method may further include fusing the first time-of-flight data and the second time-of-flight data for enhancing a signal intensity in the fused data, wherein the signal intensity depends on a material reflectivity of the illuminated object, wherein the material reflectivity is different for the first light rays at the first wavelength and the second light rays at the second wavelength.

In some embodiments, the ToF method may further include performing de-aliasing on the first time-of-flight data and the second time-of-flight data by combining phase information of the first and second wavelength.

In some embodiments, the ToF method may further include controlling the light source to emit the first light rays at the first wavelength and the second light rays at the second wavelength simultaneously.

In some embodiments, the ToF method may further include controlling the time-of-flight sensor to detect the first light rays at the first wavelength being emitted simultaneously with the second light rays at the second wavelength.

Returning to FIG. 3, there is schematically illustrated an example of a time-of-flight (ToF) system 10, which can be used for depth sensing or providing a distance measurement.

The ToF system 10 has a light source which includes two light emitting elements 11a and 11b, wherein in the present embodiment, each one of the light emitting elements 11a and 11b is a dual wavelength vertical-cavity surface-emitting laser (VCSEL), as will be discussed under reference of FIG. 4 in the following.

The first light emitting element 11a emits first light rays at a first wavelength, such as at a near infrared (NIR) wavelength, e.g. at 980 nm, and the second light emitting element 11b emits second light rays at a second wavelength, such as at a short-wave infrared (SWIR) wavelength, e.g. at 1550 nm. The first and second light rays are emitted towards an object 15 (region of interest), which reflects the light (black arrows). By repeatedly emitting light rays to the object 15, the object 15 can be illuminated, as it is generally known to the skilled person. The reflected light rays are focused by an optical stack 14, which comprises lenses, to a light detector having a ToF sensor 13, as will be discussed under reference of FIGS. 6 to 9 in the following.

In this embodiment, two dual wavelength VCSEL elements are illustrated. However, the light source may include only one dual wavelength VSCEL element 11 that emits light rays at two wavelengths.

Figure 4:
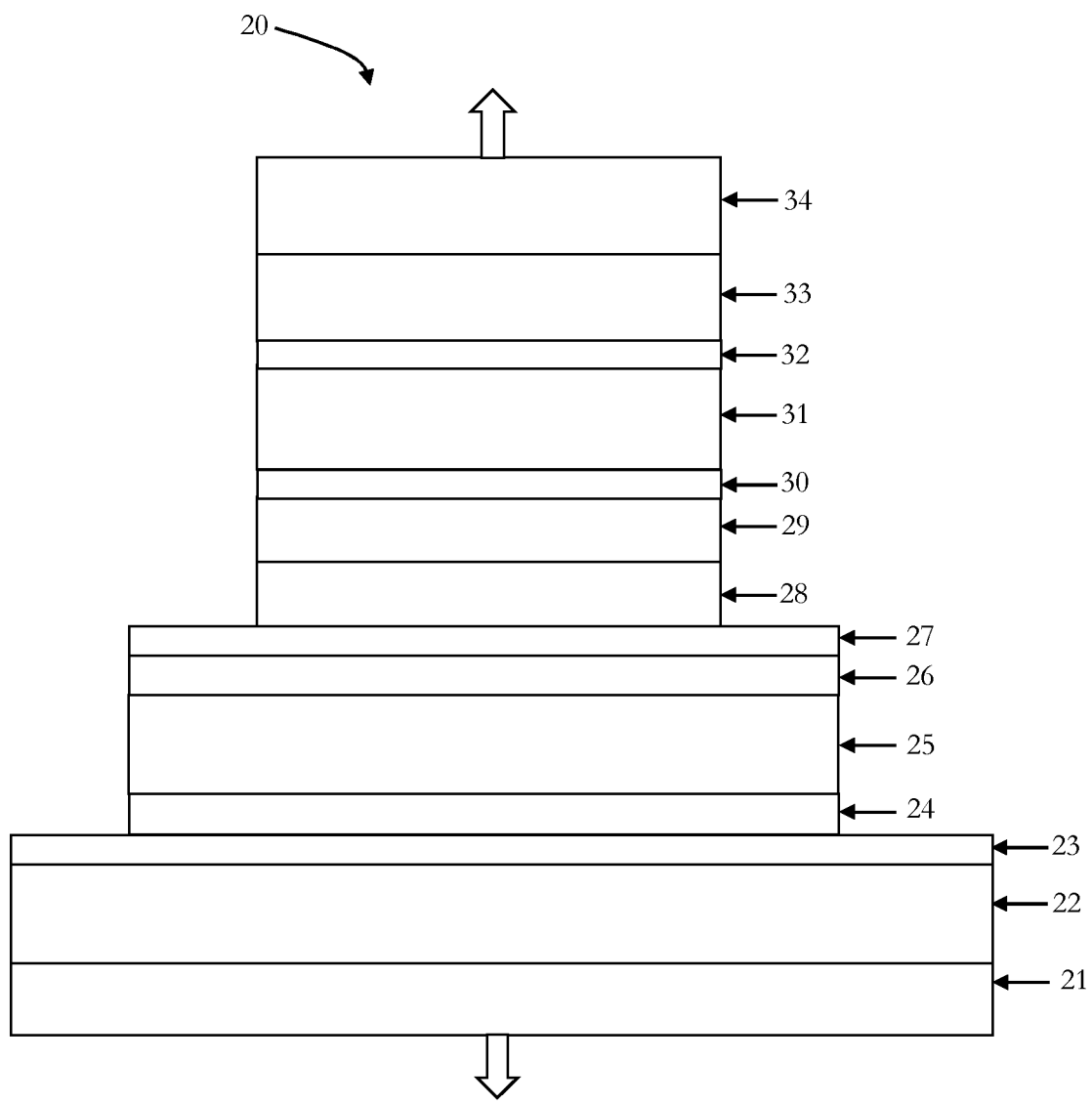
FIG. 4 schematically illustrates a side view of a dual wavelength vertical-cavity surface-emitting laser included in each one of the light emitting elements of a light source for a ToF system.

FIG. 4 schematically illustrates a side view of a dual wavelength VCSEL 20 included in each one of the light emitting elements 11a and 11b of a light source for a ToF system (such as of FIG. 3)

The dual wavelength VCSEL has a GaAs substrate 21 on which a 980 nm electrically pumped intracavity VCSEL structure made up of a 980 nm active multi-quantum well (MQW) cavity 25 with a top GaAs/Al0.8Ga0.2As DBR mirror system 28 and a bottom GaAs/Al0.8Ga0.2As DBR mirror system 22 is grown. Between the bottom GaAs/Al0.8Ga0.2As DBR mirror system 22 and the 980 nm active MQW cavity 25, an n-contact layer 23 and an n-cladding layer 24 are arranged. A p-cladding layer 26 is located on top of the 980 nm active MQW cavity 25, and a p-contact layer 27 is arranged on top of the p-cladding layer 26 and between the top GaAs/Al0.8Ga0.2As DBR mirror system 28 and the p-cladding layer 26.

The dual wavelength VCSEL has a 1550 nm active cavity 31 having a top DBR mirror system 33 and a bottom DBR mirror system 29. The 1550 nm active cavity 31 is located on the bottom DBR mirror system 29 arranged on the top GaAs/Al0.8Ga0.2As DBR mirror system 28. A n-cladding layer 30 is located between the 1550 nm active cavity 31 and the bottom DBR mirror system 29. A p-cladding layer 32 is located between the top DBR mirror system 33 and the 1550 nm active cavity 31. On top of these two VCSEL sections, i.e. the 980 nm VCSEL and the 1550 nm VCSEL, another 980 nm GaAs/Al0.8Ga0.2As DBR mirror system 34 is grown on the 1550 nm top mirror system 33.

The bottom 980 nm VCSEL is electrically pumped to produce 980 nm light output, a portion (50%) of which comes out from the bottom of the VCSEL. The remaining portion of the 980 nm light comes out of the top side, pass through the bottom GaAs/Al0.8Ga0.2As 1550 nm DBR mirror system 29, and enters into the 1550 nm MQW active region 31 termed as the active absorber region. Here the 980 nm light will be absorbed as the 1550 nm active region 31 has lower band gap. If adequate amount of light is available for absorption, the process will generate 1550 nm laser output because of the design and the top and bottom mirror systems. The 1550 nm laser output, which is generated by the optical pumping of the 980 nm laser output from the bottom electrically pumped 980 nm laser, comes out from the top of the dual cavity integrated VCSEL.

As described, for example, in published paper Islam et al "Integrated Duo Wavelength VCSEL Using an Electrically Pumped GaInAs/AlGaAs 980 nm Cavity at the Bottom and an Optically Pumped GaInAs/AlGaInAs 1550 nm Cavity on the Top", the 1550 nm light will not be able to come out from the bottom because of the 99.9% reflectivity of the 1550 nm bottom GaAs/Al0.8Ga0.2As DBR mirror system and the 980 nm laser. However, there is a chance that some 980 nm laser light may come out from the top along with the 1550 nm laser output if it is not fully absorbed. To take care of this situation, another 980 nm DBR mirror system is placed on top of the top 1550 nm DBR mirror system. In the end, 1550 nm laser output will come out from the top of the VCSEL and 980 nm laser output will come out through the bottom of the dual cavity VCSEL.

The embodiment of FIG. 4 is not limited to the two described wavelengths but may be extended to any number of wavelengths and to any wavelength. Such a dual wavelength VCSEL has a narrow spectrum in both operating wavelengths.

Figure 5:
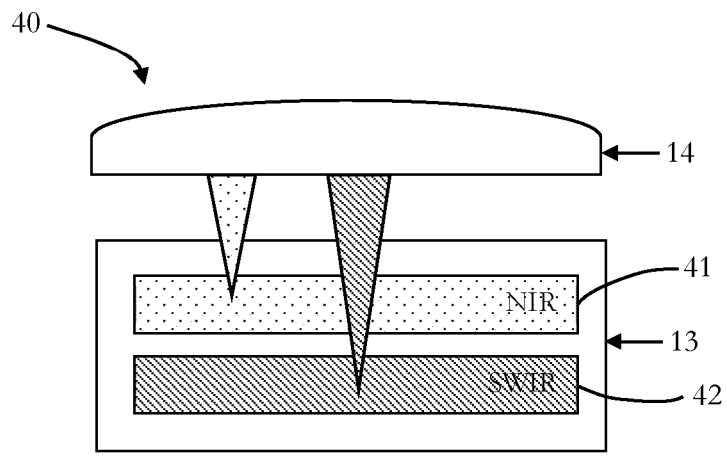
FIG. 5 schematically illustrates a side view of an embodiment of a ToF sensor for a ToF system including a first type of imaging elements arranged on a first layer and second type of imaging elements arranged on a second layer.
Figure 6:
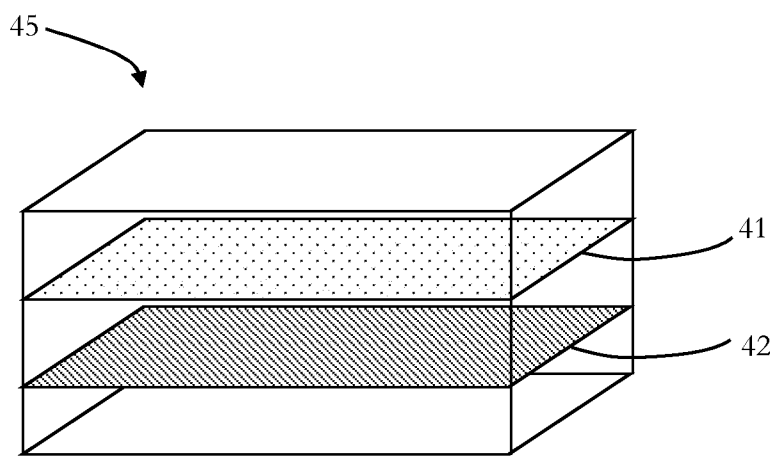
FIG. 6 schematically illustrates a top view of an embodiment of a ToF sensor for a ToF system including a first type of imaging elements arranged on a first layer and second type of imaging elements arranged on a second layer.
Figure 6:
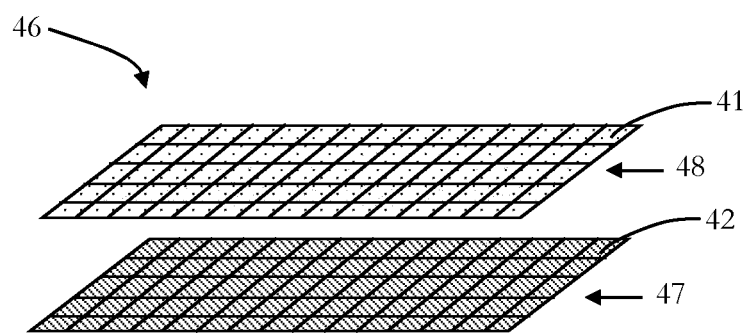

FIGS. 5 and 6 illustrate an embodiment of the ToF sensor 13 of FIG. 3, wherein FIG. 5 schematically illustrates a side view 40 of the ToF sensor 13 and the lens 14 arranged on the ToF sensor 13 and FIG. 6 schematically illustrates a top view 45 and 46 of the ToF sensor 13.

In the embodiment of FIG. 5, the ToF sensor 13 comprises two layers of imaging elements and a lens 14 that focuses the light, reflected from the illuminated object, to the ToF sensor 13. The ToF sensor 13 includes at least one first imaging element of a first type 41 configured to detect the first light rays and at least one second imaging element of a second type 42 configured to detect the second light rays. The imaging elements of the first type are arranged on a first layer and the imaging elements of the second type are arranged on a second layer. The first layer and the second layer are arranged on top of each other.

The imaging elements of the first type 41 are configured to detect the first light rays emitted at a NIR wavelength. The imaging elements of the second type 42 are configured to detect the second light rays emitted at a SWIR wavelength. The first light rays emitted at a NIR wavelength are the light rays emitted by the VCSEL 11a of FIG. 3 and the second light rays emitted at a NIR wavelength are the light rays emitted by the VCSEL 11b of FIG. 3. The lens 14 focuses the first light rays in the first layer and the second light rays in the second layer.

The upper part of FIG. 6 schematically illustrates the top view 45 of the ToF sensor 13 having the first layer and the second layer arranged on top of each other and the lower part of FIG. 6 illustrates a top view 46 of the ToF sensor 13, wherein at least one first imaging element of the first type 41 is arranged in the first layer 47 and the at least one second imaging element of the second type 42 is arranged in the second layer 48, as described in FIG. 5 above.

Figure 7:
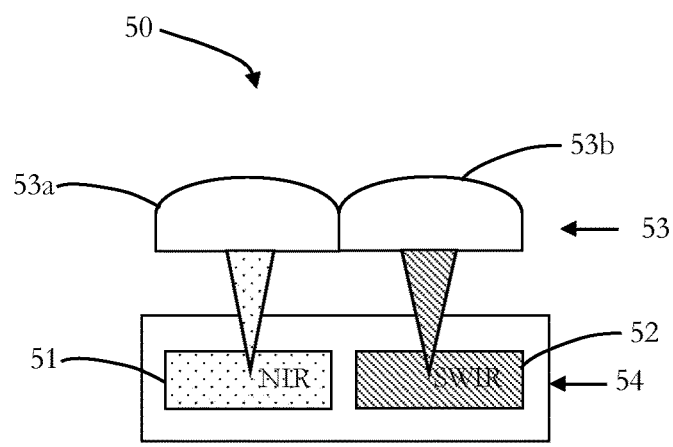
FIG. 7 schematically illustrates a side view of another embodiment of a ToF sensor including a first type and second type of imaging elements arranged on one layer.
Figure 8:
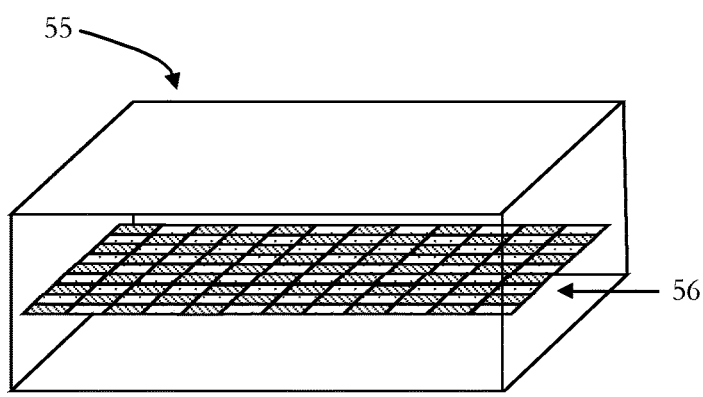
FIG. 8 schematically illustrates a top view of another embodiment of a ToF sensor including a first type and second type of imaging elements arranged on one layer.
Figure 8:
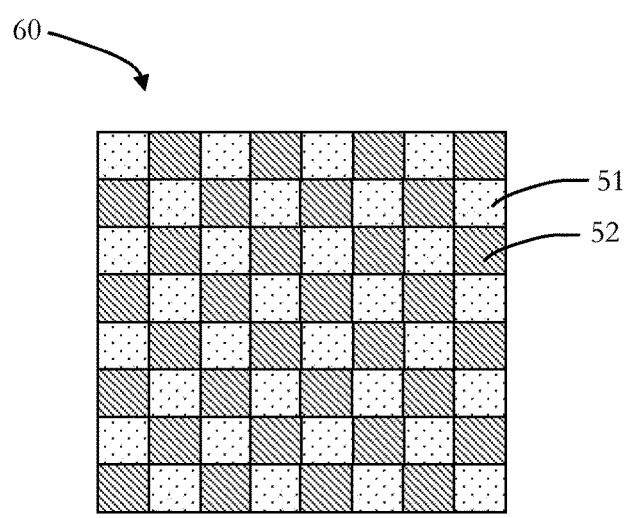

FIGS. 7 and 8 schematically illustrate another embodiment of the ToF sensor 13 of FIG. 3, wherein FIG. 7 schematically illustrates a side view 50 of a ToF sensor 54, wherein lenses 53 are arranged on the ToF sensor 54 and FIG. 8 illustrates a top view 55 and 60 of the ToF sensor 54.

In the embodiment of FIG. 7, the ToF sensor 54 comprises one layer of two types of imaging elements and two lenses 53a and 53b that focuses the light, reflected from the illuminated object, to the ToF sensor 54. The ToF sensor 54 basically corresponds to the ToF sensor 13 of FIG. 3 and includes at least one first imaging element of a first type 51 configured to detect the first light rays and at least one second imaging element of a second type 52 configured to detect the second light rays. The imaging elements of the first type 51 are configured to detect the first light rays emitted at a NIR wavelength. The imaging elements of the second type 52 are configured to detect the second light rays emitted at a SWIR wavelength. The lenses 53 which are arranged on the ToF sensor 54 include a first lens 53a that focuses the first light rays, emitted at the NIR wavelength, in the first layer 51 and a second lens 53b that focuses the second light rays, emitted at the SWIR wavelength, in the second layer 52.

The upper part of FIG. 8 schematically illustrates the top view 55 of the ToF sensor 54 having one layer 56 on which the at least one first imaging element of the first type 51 and the at least one second imaging element of the second type 52 are arranged. The first type 51 and the second type 52 of imaging elements are arranged on the layer 56 such as to form a mosaic pattern.

The lower part of FIG. 8 illustrates a top view 60 of the ToF sensor 54, wherein the at least one first imaging element of the first type 51 is adjacent to the at least one second imaging element of the second type 52 forming the mosaic pattern, as discussed herein.

Figure 9:
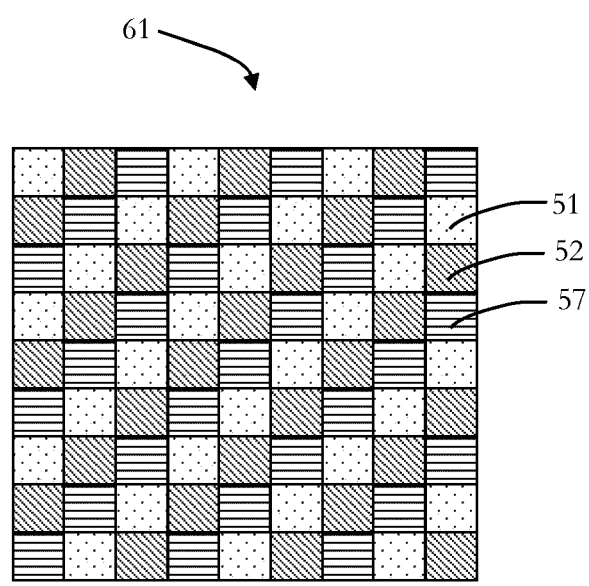
FIG. 9 schematically illustrates a top view of another embodiment of a ToF sensor including a first type, second type and a third type of imaging elements arranged on one layer.

FIG. 9 illustrates a top view 61 of the ToF sensor 54 having one layer on which the at least one first imaging element of the first type 51, the at least one second imaging element of the second type 52 and at least one third imaging element of a third type 57 are arranged. The first type 51, the second type 52 and the third type 57 of imaging elements are arranged on the layer such as to form a mosaic pattern. The at least one first imaging element of the first type 51, the at least one second imaging element of the second type 52, and the least one third imaging element of the third type 57 are adjacent one next to the other forming a mosaic pattern.

The third imaging element 57 is configured to detect third light rays emitted at a SWIR2 wavelength, at 1000 nm to 1700 nm, for example at about 1500 nm, without limiting the present embodiment in that regard. Alternatively, the third imaging element 57 may be configured to detect third light rays emitted at a UV wavelength, at 10 nm to 400 nm.

The ToF sensor of FIG. 9, basically corresponds to the ToF sensor 54 of FIG. 7 and the lenses 53 comprise a third type of lens that focuses the third light rays, emitted for example, at the SWIR2 wavelength, in the third layer 57.

Figure 10:
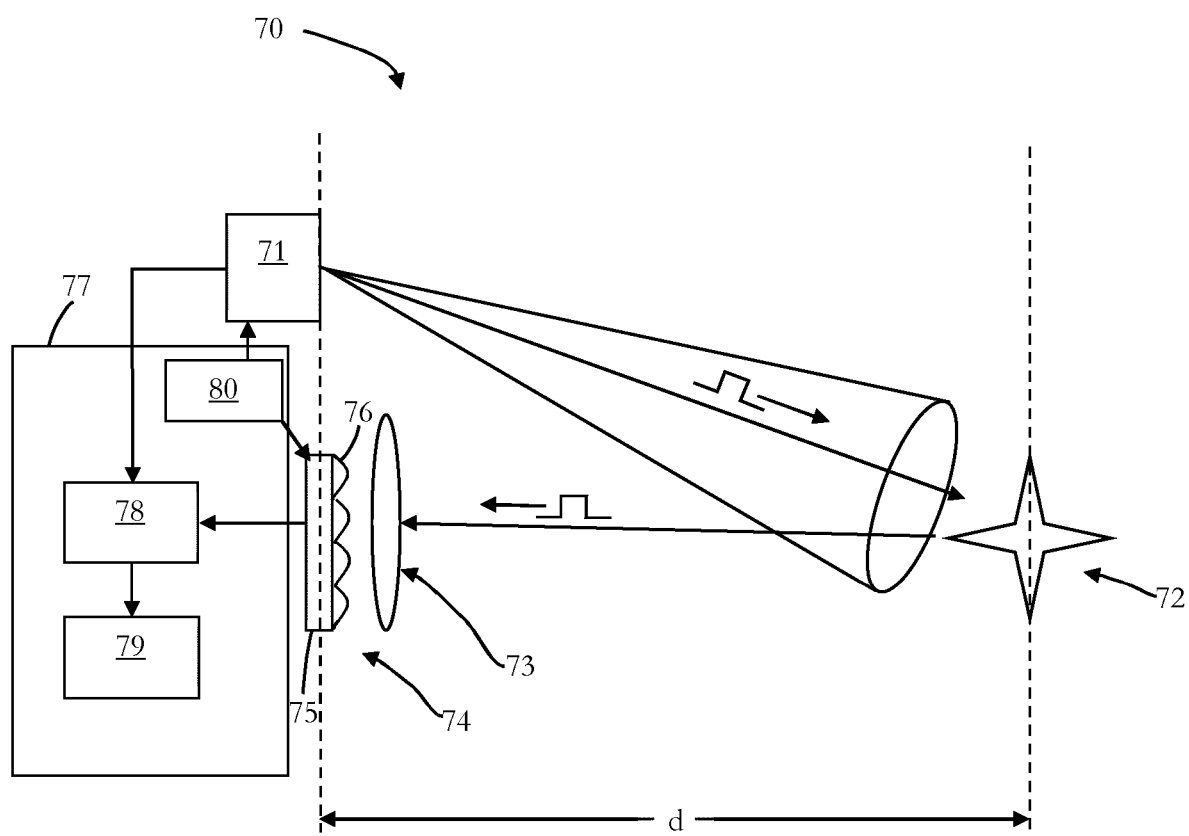
FIG. 10 schematically illustrates a time-of-flight depth sensing system.

FIG. 10 generally illustrates a time-of-flight depth sensing system 70. The system 70 basically corresponds to the ToF system 10 discussed above under reference of FIG. 3. The system 70 has a pulsed light source 71, which can be any kind of light source suitable for time-of-flight depth sensing and it includes, for example, at least one light emitting element, such as the dual wavelength VCSEL 20 as discussed above under reference of FIG. 4. The light source 71 emits first and second light rays to an object 72 (region of interest), which reflects the light.

The reflected light is focused by an optical stack 73 to a light detector 74. The light detector 74 has an image sensor 75, which basically correspond to the ToF sensor 13, as discussed above under reference of FIGS. 5 to 9, and at least two types of lenses 76, as discussed above under reference of FIG. 7 and FIG. 9, which focus the light reflected from the object 72 to the ToF sensor 75.

For example, the lenses 76 may be implemented as the lenses described with regard to FIGS. 7 and 9 above. The lenses 76 may include a first lens that focuses the first light rays, emitted at the NIR wavelength, in the first layer and a second lens that focuses the second light rays, emitted at the SWIR wavelength, in the second layer, without limiting the present embodiment in that regard. Alternatively, the lenses 76 may include a third lens that focuses the third light rays, emitted at the SWIR 2 or UV wavelength, without limiting the present embodiment in that regard. Alternatively, the lenses 76 may include a third lens that focuses the third light rays, emitted at the SWIR 2 wavelength and may also include a fourth lens that focuses the fourth light rays, emitted at the UV wavelength.

The light emission time information is fed from the light source 71 to a circuitry 77 including a time-of-flight measurement unit 78, which also receives respective time information from the ToF sensor 75, when the light is detected after being reflected by the object 72. Based on the emission time information received from the light source 71 and the time of arrival information received from the ToF sensor 75, the time-of-flight measurement unit 78 computes a round-trip time of the light emitted from the light source 71 and reflected by the object 72 and on the basis thereon it computes a distance d (depth information) between the image sensor 75 and the object 72.

The depth information is fed from the time-of-flight measurement unit 78 to a 3D image reconstruction unit 79 of the circuitry 77, which reconstructs (generates) a 3D image of the object 72 based on the depth information received from the time-of-flight measurement unit 78. The 3D image reconstruction unit 79 may have a logic circuit configured to fuse the first time-of-flight data and the second time-of-flight data for enhancing a signal intensity in the fused data, wherein the signal intensity depends on a material reflectivity of the object 72 illuminated by the light source 71, as discussed herein. The logic circuit may also perform de-aliasing on the first time-of-flight data and the second time-of-flight data by combining phase information of the first and second wavelength, without limiting the present embodiment in that regard. The logic circuit may be implemented by a processor outside of the ToF system 70, or the like.

Moreover, the ToF system 70 further has a control 80 (included in the circuitry 77 and here it includes a logic circuit) to control the operating wavelength after a voltage application, such that to control the light source 71 to emit the first light rays at the first wavelength and the second light rays at the second wavelength simultaneously or sequentially, as described herein. The first wavelength and second wavelength are each selected based on the material reflectivity of the object 72 illuminated by the light source 71, as discussed herein.

In the embodiment described with regard to FIG. 10, the light detector 74 has an image sensor 75, and at least two types of lenses 76, which focus the light reflected from the object 72 to the ToF sensor 75, without limiting the present disclosure in that regard. Alternatively, in some embodiments, the light detector 74 comprises an image sensor 75, which basically corresponds to the ToF sensor 13, as discussed above under reference of FIGS. 5 to 9, and it comprises one lens arranged on the ToF sensor 13, which basically corresponds to the lens 14 arranged on the ToF sensor 13, as discussed above under reference of FIGS. 5 to 6. In such embodiments, the lens focuses the first light rays in the first layer and the second light rays in the second layer.

Figure 11:
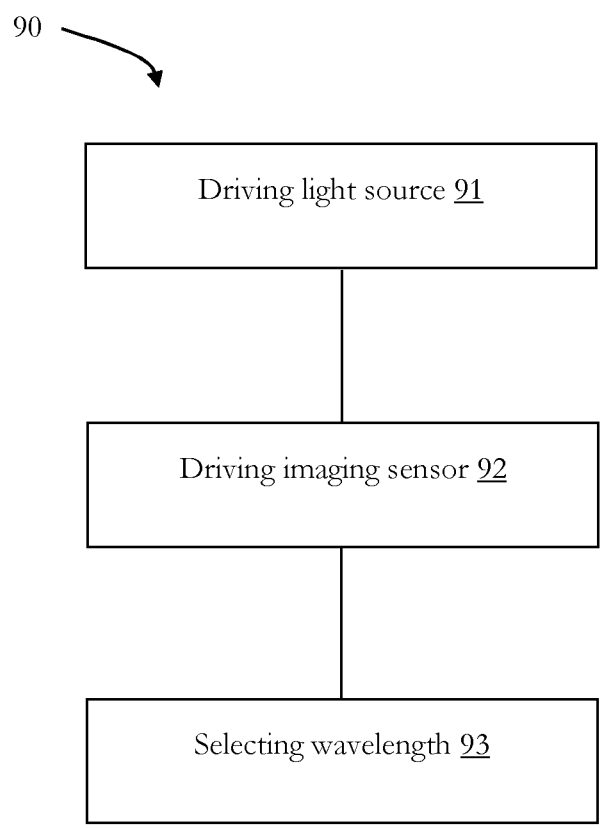
FIG. 11 is a flowchart of an embodiment of a time-of-flight method for controlling a ToF system.

FIG. 11 is a flowchart of an embodiment of a time-of-flight method 90, which may be performed by a time-of-flight system, such as the time-of-flight system 10 of FIGS. 3 and/or 70 of FIG. 10 discussed herein.

In the following, the method 90 is discussed based on the functions of the time-of-flight system 70 of FIG. 10 without limiting the present disclosure in that regard. Generally, the method 90 may be used for controlling a time-of-flight system, as discussed herein.

At 91, the light source 71 is driven by controlling a corresponding voltage application, wherein the voltage application causes the light source 71 to emit first light rays generated by the dual wavelength vertical-cavity surface-emitting laser at a first wavelength and to emit second light rays generated by the dual wavelength VCSEL at a second wavelength, as discussed herein.

At 92, the ToF sensor 75 is driven by controlling a corresponding voltage application and read out of the ToF sensor 75, such that the ToF sensor 75 detects the first light rays at the first wavelength and the second light rays at the second wavelength, and generates first time-of-flight data associated with the detected first light rays and second time-of-flight data associated with the detected second light rays, as discussed herein. As discussed, the operating wavelength of the ToF sensor 75 corresponds to the operating wavelength of the light source 71, namely the first and/or the second wavelength.

At 93, the operating wavelength is selected by voltage application. The voltage application is such controlled or selected that the operating wavelength of the light source 71 and the ToF sensor 75 of the time-of-flight system 70 correspond to each other, as discussed herein. The selection of the operation wavelength may be based on a material reflectivity of the object 72 illuminated by the light source 71, as discussed herein.

As mentioned, the time-of-flight system 70 is able to function at two wavelengths, without limiting the present disclosure in that regard. The time-of-flight system 70 may be able to function at two or more wavelengths. That is, the light source 71 of the ToF system 70 can emit light rays on more than one wavelength, namely a first wavelength and a second wavelength, wherein the second wavelength is larger than the first wavelength. Hence, a multiple integrated wavelengths illumination is provided, wherein the light source 71 of the ToF system 70 emits light around all operating wavelengths in a narrow portion of the spectrum, which is the case in VCSELs for instance, in order to effectively see an increase in SNR in presence of sunlight, i.e. to filter out sunlight as efficiently as possible. Additionally, the design of the lenses 76 and of the ToF sensor 75 may take into account the penetration depth of the photons to focus the light at the correct depth such that pixel cross-talk is minimized. The ToF sensor 75 may be selective such that to reject ambient light in portions of the spectrum where active light is absent.

Figure 12:
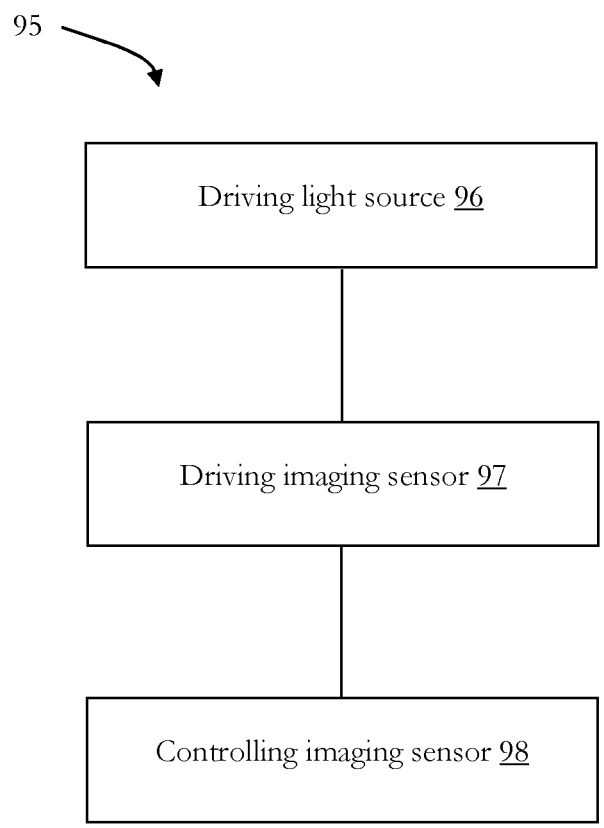
FIG. 12 is a flowchart of another embodiment of a time-of-flight method for controlling a time-of-flight system.

FIG. 12 is a flowchart of an embodiment of a time-of-flight method 95, which may be performed by a time-of-flight system, such as the time-of-flight system 10 of FIGS. 3 and/or 70 of FIG. 10 discussed herein.

At 96, the light source 71 is driven by controlling a corresponding voltage application, wherein the voltage application causes the light source 71 to emit first light rays generated by the dual wavelength vertical-cavity surface-emitting laser at a first wavelength and to emit second light rays generated by the dual wavelength VCSEL at a second wavelength, as discussed herein.

At 97, the ToF sensor 75 is driven by controlling a corresponding voltage application and read out of the ToF sensor 75, such that the ToF sensor 75 detects the first light rays at the first wavelength and the second light rays at the second wavelength, and generates first time-of-flight data associated with the detected first light rays and second time-of-flight data associated with the detected second light rays, as discussed herein. As discussed, the operating wavelength of the ToF sensor 75 corresponds to the operating wavelength of the light source 71, namely the first and/or the second wavelength.

At 98, the ToF sensor 75 is controlled to detect the light reflected from the object 72 to the ToF sensor 75. As discussed herein, the ToF sensor 75 comprises at least two types of imaging elements and lenses that focus the light, reflected from the illuminated object, to the ToF sensor. The ToF sensor 75 may be controlled to detect the first light rays at the first wavelength being emitted simultaneously with the second light rays at the second wavelength.

For example, as described in the embodiment of FIGS. 5 and 6, the ToF sensor may have two layers and the ToF sensor may include at least one first imaging element of a first type configured to detect the first light rays and at least one second imaging element of a second type configured to detect the second light rays. The imaging elements of the first type may be arranged on a first layer and the imaging elements of the second type may be arranged on a second layer. The first layer and the second layer are arranged on top of each other. The lens which is arranged on the ToF sensor focuses the first light rays to the first layer and the second light rays to the second layer.

Alternatively, as described in the embodiment of FIGS. 7 and 8, the ToF sensor may have one layer on which the at least one first imaging element of the first type and the at least one second imaging element of the second type may be arranged. The first type and the second type of imaging elements may be arranged on the layer such as to form a mosaic pattern. The lenses which are arranged on the ToF sensor may include a first lens that focuses the first light rays, emitted at the first wavelength, in the first layer and a second lens that focuses the second light rays, emitted at the second wavelength, in the second layer, without limiting the present embodiment in that regard. As described in the embodiment of FIG. 9, the ToF sensor may have one layer on which at least one first imaging element of the first type, at least one second imaging element of the second type and at least one third imaging element of a third type may be arranged, and the lenses arranged on the ToF sensor focus the first, second and third type of light rays to the first, second and third type of imaging elements respectively.

The methods as described herein, in particular methods 90 and 95, are also implemented in some embodiments as a computer program causing a computer and/or a processor to perform the method, when being carried out on the computer and/or processor. In some embodiments, a nontransitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example, the ordering of 91 and 92 in the embodiment of FIG. 11 and/or the ordering of 96 and 97 in the embodiment of FIG. 12 may be exchanged. Other changes of the ordering of method steps may be apparent to the skilled person.

Please note that the division of the control 77 into units 78 and 79 is only made for illustration purposes and that the present disclosure is not limited to any specific division of functions in specific units. For instance, the control 77 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.
(1) A Time-of-Flight system comprising:
a light source configured to emit first light rays at a first wavelength and second light rays at a second wavelength to an object, the second wavelength being larger than the first wavelength; and
a time-of-flight sensor configured to detect the first light rays at the first wavelength and the second light rays at the second wavelength, and to generate first time-of-flight data associated with the detected first light rays and second time-of-flight data associated with the detected second light rays.
(2) The Time-of-Flight system of (1), wherein the time-of-flight sensor includes at least one first imaging element of a first type configured to detect the first light rays and at least one second imaging element of a second type configured to detect the second light rays.
(3) The Time-of-Flight system of (2), wherein the at least one first imaging element of the first type is arranged in a first layer and the at least one second imaging element of the second type is arranged in a second layer, the first and second layer being arranged on top of each other.
(4) The Time-of-Flight system of (2), wherein the least one first imaging element of the first type is adjacent to the least one second imaging element of the second type.
(5) The Time-of-Flight system of (4), wherein the first type and second type of imaging elements are arranged in one layer forming a mosaic pattern.
(6) The Time-of-Flight system of anyone of (1) to (5), wherein the time-of-flight sensor further includes a tunable filter configured to pass either the first light rays or the second light rays.
(7) The Time-of-Flight system of (2), wherein the first time-of-flight data are generated by applying a first demodulation scheme to the at least one first imaging element of the first type and the second time-of-flight data are generated by applying a second demodulation scheme to the at least one second imaging element of the second type, the first demodulation scheme being applied independently from the second demodulation scheme.
(8) The Time-of-Flight system of anyone of (1) to (7), wherein the first wavelength is within a near-infrared range and the second wavelength is within a short-wave infrared range.
(9) The Time-of-Flight system of anyone of (1) to (8), wherein the light source includes at least one dual vertical-cavity surface-emitting laser configured to emit the first light rays and/or the second light rays.
(10) The Time-of-Flight system of (3) further comprising:
a first lens configured to focus the first light rays in the first layer and a second lens configured to focus the second light rays in the second layer.
(11) The Time-of-Flight system of anyone of (1) to (10) further comprising:
a control configured to control the light source to emit the first light rays at the first wavelength and the second light rays at the second wavelength simultaneously.
(12) The Time-of-Flight system of anyone of (1) to (11) further comprising:
a logic circuit configured to fuse the first time-of-flight data and the second time-of-flight data for enhancing a signal intensity in the fused data, wherein the signal intensity depends on a material reflectivity of the object illuminated by the light source, wherein the material reflectivity is different for the first light rays at the first wavelength and the second light rays at the second wavelength.
(13) The Time-of-Flight system of (12), wherein the first and second wavelength are each selected based on the material reflectivity of the object illuminated by the light source.
(14) The Time-of-Flight system of (12), wherein the logic circuit is further configured to perform de-aliasing on the first time-of-flight data and the second time-of-flight data by combining phase information of the first and second wavelength.
(15) A Time-of-Flight method, comprising:
driving a light source to emit first light rays at a first wavelength and second light rays at a second wavelength to an object, the second wavelength being larger than the first wavelength; and
driving a time-of-flight sensor to detect the first light rays at the first wavelength and the second light rays at the second wavelength, and to generate first time-of-flight data associated with the detected first light rays and second time-of-flight data associated with the detected second light rays.
(16) A Time-of-Flight method, comprising:
emitting first light rays at a first wavelength and second light rays at a second wavelength to an object, the second wavelength being larger than the first wavelength;
detecting the first light rays at the first wavelength and the second light rays at the second wavelength; and
generating first time-of-flight data associated with the detected first light rays and second time-of-flight data associated with the detected second light rays.
(17) The Time-of-Flight method of (16), further comprising:
fusing the first time-of-flight data and the second time-of-flight data for enhancing a signal intensity in the fused data, wherein the signal intensity depends on a material reflectivity of the illuminated object, wherein the material reflectivity is different for the first light rays at the first wavelength and the second light rays at the second wavelength.
(18) The Time-of-Flight method of (17), further comprising:
performing de-aliasing on the first time-of-flight data and the second time-of-flight data by combining phase information of the first and second wavelength.
(19) The Time-of-Flight method of (17) or (18), further comprising:
controlling the light source to emit simultaneously the first light rays at the first wavelength and the second light rays at the second wavelength.
(20) The Time-of-Flight method of anyone of (17) to (19), further comprising:
controlling the time-of-flight sensor to detect the first light rays at the first wavelength being emitted simultaneously to the second light rays at the second wavelength.

The invention claimed is:
1. A Time-of-Flight system comprising:
a light receiver configured to receive first light rays at a first wavelength and second light rays at a second wavelength reflected from an object, the second wavelength being larger than the first wavelength; and a time-of-flight sensor configured to detect the first light rays at the first wavelength and the second light rays at the second wavelength, and to generate first time-of-flight data associated with the detected first light rays and second time-of-flight data associated with the detected second light rays, wherein the time-of-flight sensor includes at least one first imaging element of a first type configured to detect the first light rays and at least one second imaging element of a second type configured to detect the second light rays, and the first time-of-flight data are generated by applying a first demodulation scheme to the at least one first imaging element of the first type and the second time-of-flight data are generated by applying a second demodulation scheme to the at least one second imaging element of the second type, the first demodulation scheme being applied independently from the second demodulation scheme.

2. The Time-of-Flight system of claim 1, wherein the at least one first imaging element of the first type is arranged in a first layer and the at least one second imaging element of the second type is arranged in a second layer, the first and second layer being arranged on top of each other.

3. The Time-of-Flight system of claim 2 further comprising:
a first lens configured to focus the first light rays in the first layer and a second lens configured to focus the second light rays in the second layer.

4. The Time-of-Flight system of claim 1, wherein the least one first imaging element of the first type is adjacent to the least one second imaging element of the second type.

5. The Time-of-Flight system of claim 4, wherein the first type and second type of imaging elements are arranged in one layer forming a mosaic pattern.

6. The Time-of-Flight system of claim 1, wherein the time-of-flight sensor further includes a tunable filter configured to pass either the first light rays or the second light rays.

7. The Time-of-Flight system of claim 1, wherein the first wavelength is within a near-infrared range and the second wavelength is within a short-wave infrared range.

8. The Time-of-Flight system of claim 1, wherein the first light rays at the first wavelength and the second light rays at the second wavelength are received simultaneously.

9. The Time-of-Flight system of claim 1 further comprising:
a logic circuit configured to fuse the first time-of-flight data and the second time-of-flight data for enhancing a signal intensity in the fused data, wherein the signal intensity depends on a material reflectivity of the object illuminated by the light source, wherein the material reflectivity is different for the first light rays at the first wavelength and the second light rays at the second wavelength.

10. The Time-of-Flight system of claim 9, wherein the first and second wavelength are each selected based on the material reflectivity of the object illuminated by the light source.

11. The Time-of-Flight system of claim 9, wherein the logic circuit is further configured to perform de-aliasing on the first time-of-flight data and the second time-of-flight data by combining phase information of the first and second wavelength.

12. A Time-of-Flight method, comprising:
receiving first light rays at a first wavelength and second light rays at a second wavelength reflected from an object, the second wavelength being larger than the first wavelength;
detecting the first light rays at the first wavelength and the second light rays at the second wavelength;
generating first time-of-flight data associated with the detected first light rays and second time-of-flight data associated with the detected second light rays; and
fusing the first time-of-flight data and the second time-of-flight data for enhancing a signal intensity in the fused data, wherein the signal intensity depends on a material reflectivity of the illuminated object, wherein the material reflectivity is different for the first light rays at the first wavelength and the second light rays at the second wavelength.

13. The Time-of-Flight method of claim 12, further comprising:
performing de-aliasing on the first time-of-flight data and the second time-of-flight data by combining phase information of the first and second wavelength.

14. The Time-of-Flight method of claim 12, further comprising:
controlling the time-of-flight sensor to detect the first light rays at the first wavelength being emitted simultaneously to the second light rays at the second wavelength.

15. A Time-of-Flight system, comprising:
a light receiver configured to receive first light rays at a first wavelength and second light rays at a second wavelength reflected from an object, the second wavelength being larger than the first wavelength;
a time-of-flight sensor configured to
detect the first light rays at the first wavelength and the second light rays at the second wavelength, and
generate first time-of-flight data associated with the detected first light rays and second time-of-flight data associated with the detected second light rays; and
a logic circuit configured to fuse the first time-of-flight data and the second time-of-flight data for enhancing a signal intensity in the fused data, wherein the signal intensity depends on a material reflectivity of the illuminated object, wherein the material reflectivity is different for the first light rays at the first wavelength and the second light rays at the second wavelength.

* * * * *